United States Patent
Kim et al.

(10) Patent No.: US 10,211,609 B2
(45) Date of Patent: Feb. 19, 2019

(54) TRANSPORTATION DEVICE OF WITHDRAWABLE CIRCUIT BREAKER

(71) Applicant: LSIS CO., LTD., Anyang-si, Gyeonggi-do (KR)

(72) Inventors: Il Hyun Kim, Suwon-si (KR); Hong Ik Yang, Cheongju-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 469 days.

(21) Appl. No.: 14/743,864

(22) Filed: Jun. 18, 2015

(65) Prior Publication Data
US 2016/0164267 A1 Jun. 9, 2016

(30) Foreign Application Priority Data
Dec. 5, 2014 (KR) ........................ 10-2014-0174411

(51) Int. Cl.
*H02B 11/133* (2006.01)
*E05C 9/04* (2006.01)
(Continued)

(52) U.S. Cl.
CPC ............ *H02B 11/133* (2013.01); *E05C 9/043* (2013.01); *E05C 9/046* (2013.01);
(Continued)

(58) Field of Classification Search
CPC .......... H02B 11/133; E05C 9/04–9/048; Y10T 292/0839
See application file for complete search history.

(56) References Cited

U.S. PATENT DOCUMENTS 126,404 A * 5/1872 Lecloux ................. E05C 9/043
  292/36
166,842 A * 8/1875 Berryman .............. E05C 9/043
  292/40
(Continued)

FOREIGN PATENT DOCUMENTS

CN      2938498       8/2007
CN    201278440       7/2009
(Continued)

OTHER PUBLICATIONS

European Patent Office Application No. 15173256.7, Search Report dated Apr. 14, 2016, 7 pages.

*Primary Examiner* — Robert J Hoffberg
(74) *Attorney, Agent, or Firm* — K&L Gates LLP (57) ABSTRACT

The present invention relates to a transportation device of a withdrawable circuit breaker, and more particularly, to a transportation device of a withdrawable circuit breaker capable of simultaneously moving right and left handles of a girder assembly for restricting movement of the transportation device or releasing a restricted state. The transportation device of a circuit breaker includes: a truck assembly on which a body of the circuit breaker is loadable; a body plate of a girder assembly installed on a front surface of the truck assembly; a pair of sliding plates slidably installed in the body plate; and a rotation plate having both sides to which leg portions of the sliding plates are rotatably coupled, respectively, wherein the rotation plate is inserted into a lead screw penetratingly-formed at a central part of the girder assembly.

2 Claims, 11 Drawing Sheets

(51) Int. Cl.
  *H02B 11/167* (2006.01)
  *H02B 11/127* (2006.01)
  *H01H 71/02* (2006.01)

(52) U.S. Cl.
  CPC ........ *H01H 71/0207* (2013.01); *H02B 11/127* (2013.01); *H02B 11/167* (2013.01)

(56) References Cited

U.S. PATENT DOCUMENTS

| | | | | |
|---|---|---|---|---|
| 768,418 | A * | 8/1904 | Adams | E05C 9/043 292/36 |
| 1,142,463 | A * | 6/1915 | Sheperd | E05B 59/00 292/40 |
| 1,909,697 | A * | 5/1933 | MacBeth | E05B 13/004 292/150 |
| 2,594,253 | A * | 4/1952 | Vander Veer | B60J 9/02 292/181 |
| 2,729,089 | A * | 1/1956 | Pelcin | E05B 47/0002 292/36 |
| 2,787,154 | A * | 4/1957 | Wesberry | E05C 9/041 292/39 |
| 2,920,474 | A * | 1/1960 | Johns | E05B 9/00 292/33 |
| 3,622,187 | A * | 11/1971 | Emery | E05C 9/043 292/139 |
| 3,783,209 | A | 1/1974 | Cleaveland et al. | |
| 4,088,353 | A * | 5/1978 | Meyer | E05B 65/10 292/150 |
| 4,147,044 | A * | 4/1979 | Bernath | E05B 65/0082 292/36 |
| 4,204,724 | A * | 5/1980 | Bauer | G03B 42/04 206/1.5 |
| 4,288,944 | A * | 9/1981 | Donovan | E05C 9/042 292/39 |
| 4,387,917 | A * | 6/1983 | Cocker | E05B 63/20 292/40 |
| 4,639,021 | A * | 1/1987 | Hope | E05C 9/043 292/40 |
| 4,683,732 | A * | 8/1987 | Beattie | E05B 65/0075 109/59 R |
| 5,131,699 | A * | 7/1992 | Frestadius | E05C 9/043 292/337 |
| 5,244,238 | A * | 9/1993 | Lindqvist | E05B 65/0841 292/36 |
| 5,280,755 | A * | 1/1994 | Batur | E05B 65/0075 109/50 |
| 5,437,484 | A * | 8/1995 | Yamada | E05B 35/008 292/336.3 |
| 5,487,289 | A * | 1/1996 | Otto, III | E05B 47/0002 292/150 |
| 5,595,076 | A * | 1/1997 | Weinerman | E05B 5/00 292/34 |
| 5,791,700 | A * | 8/1998 | Biro | E05C 9/043 292/36 |
| 5,806,353 | A * | 9/1998 | Pages | E05C 9/042 292/34 |
| 6,065,314 | A * | 5/2000 | Nicholson | E05B 67/383 292/218 |
| 6,622,883 | B1 * | 9/2003 | Wu | H01L 21/67373 206/710 |
| 6,689,968 | B2 * | 2/2004 | Trivette | H01H 33/666 200/50.21 |
| 6,884,949 | B2 * | 4/2005 | Yoon | H02B 11/133 200/50.26 |
| 6,923,028 | B2 * | 8/2005 | Caldwell | E05B 17/2023 292/148 |
| 7,182,373 | B2 * | 2/2007 | Yamada | E05B 83/30 292/141 |
| 7,434,486 | B2 * | 10/2008 | Czarnek | F16C 17/02 74/89.36 |
| 7,775,564 | B2 * | 8/2010 | Moore | E05B 13/001 220/730 |
| 7,997,630 | B2 * | 8/2011 | Lemley | E05B 83/02 292/3 |
| 8,183,480 | B2 * | 5/2012 | Kim | H02B 11/127 200/50.21 |
| 8,294,051 | B2 * | 10/2012 | Park | H02B 11/133 200/50.21 |
| 8,395,064 | B2 * | 3/2013 | Kim | H02B 11/133 200/50.21 |
| 8,657,345 | B1 * | 2/2014 | Shih | E05B 63/0056 292/32 |
| 8,960,731 | B2 * | 2/2015 | Lemley | E05B 83/02 292/3 |
| 9,567,775 | B2 * | 2/2017 | Moore | E05B 13/001 |
| 9,607,784 | B2 * | 3/2017 | Benke | H01H 9/24 |
| 9,835,235 | B2 * | 12/2017 | Devanand | F16H 25/20 |
| 9,882,358 | B2 * | 1/2018 | Kim | H02B 11/127 |
| 2010/0307062 | A1 * | 12/2010 | Moore | E05B 13/001 49/394 |
| 2014/0260731 | A1 * | 9/2014 | Devanand | F16H 25/20 74/89.23 |
| 2015/0345181 | A1 * | 12/2015 | Moore | E05B 13/001 49/58 |
| 2016/0156164 | A1 * | 6/2016 | Yang | H01H 33/46 200/50.24 |
| 2017/0155234 | A1 * | 6/2017 | Benke | H02B 11/133 |
| 2017/0194774 | A1 * | 7/2017 | Kim | H02B 11/127 |

FOREIGN PATENT DOCUMENTS

| | | | | |
|---|---|---|---|---|
| CN | 201554303 U | | 8/2010 | |
| CN | 201598082 | | 10/2010 | |
| CN | 101937799 | | 1/2011 | |
| CN | 201856709 U | | 6/2011 | |
| DE | 10006427 | * | 8/2001 | |
| DE | 102004009973 A1 | * | 9/2005 | ......... E05B 65/1006 |
| DE | 202015000208 U1 | * | 4/2015 | ......... E05B 17/2034 |
| DE | 102015013620 A1 | * | 4/2017 | ......... E05B 63/14 |
| EP | 0109544 B1 | * | 5/1989 | ......... H02B 11/133 |
| EP | 1520949 A2 | | 4/2005 | ......... E05B 63/042 |
| EP | 2267852 | | 12/2010 | |
| FR | 1255812 | | 3/1961 | |
| GB | 2384366 | | 7/2003 | |
| JP | 07298419 | | 11/1995 | |
| JP | H09238415 | | 9/1997 | |
| KR | 200298455 | | 12/2002 | |
| KR | 100505052 | | 8/2005 | |
| WO | WO 2004099537 A1 | * | 11/2004 | ......... E05B 47/0688 |

* cited by examiner

FIG. 1

Prior Art

Fig. 2

Prior Art

Fig. 3

Prior Art

Fig. 4A

Prior Art

Fig. 4B

Prior Art

Fig. 5

Prior Art

Fig. 6

Prior Art

Fig. 7

Prior Art

TRANSPORTATION DEVICE OF WITHDRAWABLE CIRCUIT BREAKER

CROSS-REFERENCE TO RELATED APPLICATION

Pursuant to 35 U.S.C. § 119(a), this application claims the benefit of earlier filing date and right of priority to Korean Patent Application No. 10-2014-0174411, filed on Dec. 5, 2014, the contents of which are all hereby incorporated by reference herein in its entirety.

BACKGROUND OF THE INVENTION

1. Field of the Invention

The present invention relates to a transportation device of a withdrawable circuit breaker, and more particularly, to a transportation device of a withdrawable circuit breaker capable of simultaneously moving right and left handles of a girder assembly for restricting movement of the transportation device or releasing a restricted state of the transportation device.

2. Background of the Invention

Generally, a circuit breaker is installed at a distribution board provided to drive or control a power plant, a substation, etc., or to drive a motor, with other electric devices. The circuit breaker is generally accommodated in a cradle fixed to the distribution board.

The cradle has a service position and a test position therein. The service position indicates a position where a voltage and a current are supplied as a terminal of a body of the circuit breaker is connected to a terminal of the cradle, and the test position indicates a position where only an operation test of the circuit breaker is executable as the terminal of the body of the circuit breaker is separated from the terminal of the cradle.

An operation to insert the circuit breaker so as to connect with a line part of the cradle is called an 'insert' operation, and an operation to withdraw the circuit breaker is called a 'pull out' operation.

Figure 1:
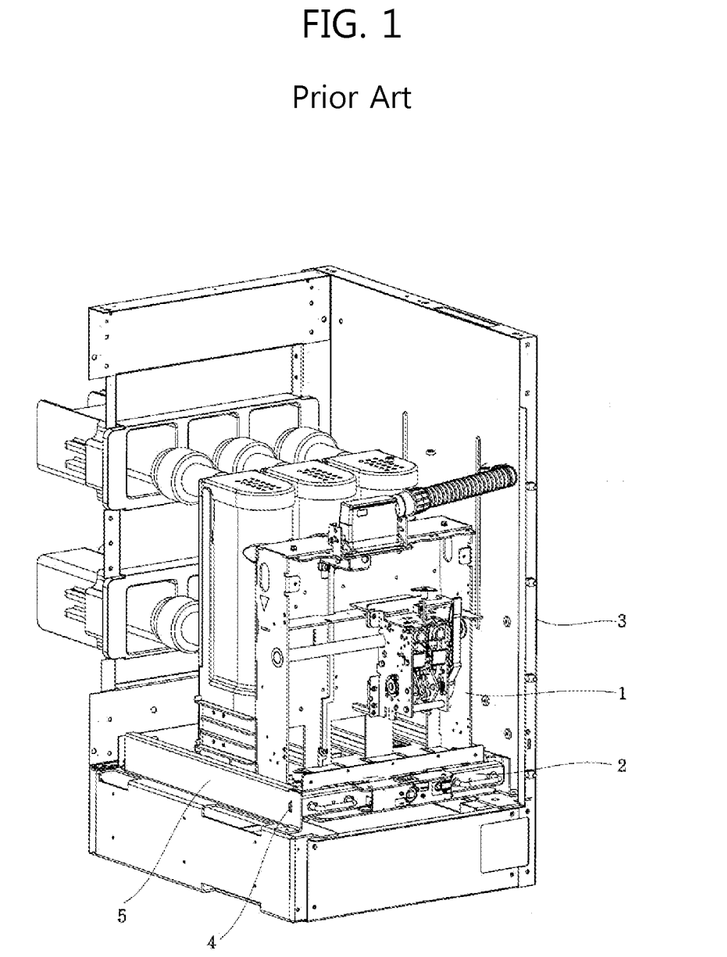
FIG. 1 is a perspective view illustrating a mounted state of a circuit breaker and a transportation device to a distribution box in accordance with the conventional art.

FIG. 1 is a perspective view of a circuit breaker in accordance with the conventional art, which shows a mounted state of a body 1 of the circuit breaker and a transportation device 2 to a cradle 3. The body 1 of the circuit breaker is partially shown. That is, the body 1 having a front cover removed therefrom is shown. Such a box-shaped cradle is called a distribution box. FIG. 2

Figure 2:
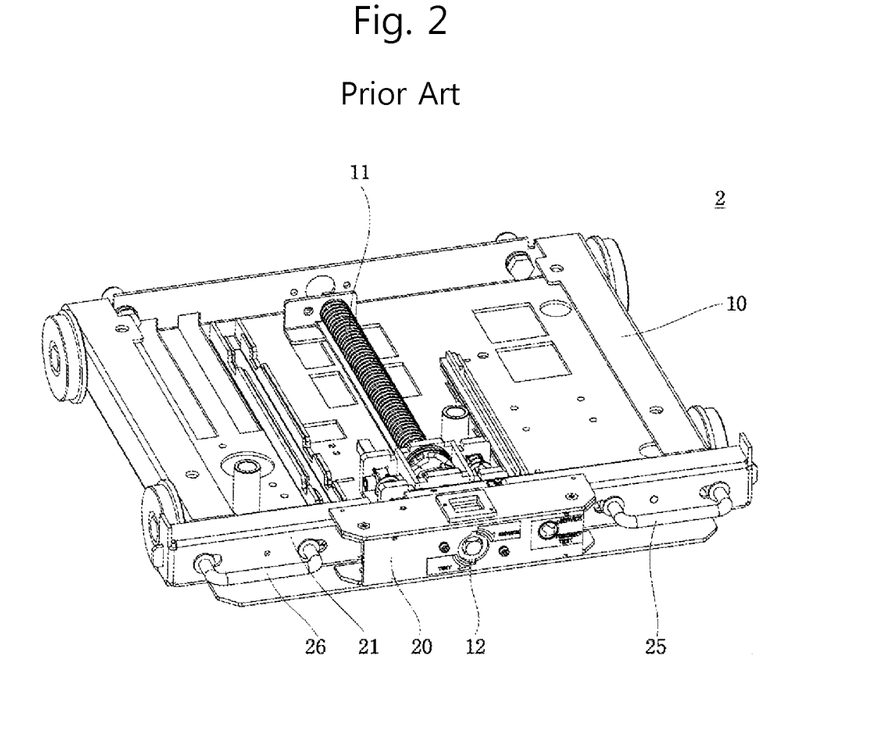
FIG. 2 is a perspective view of the transportation device of FIG. 1.
Figure 3:
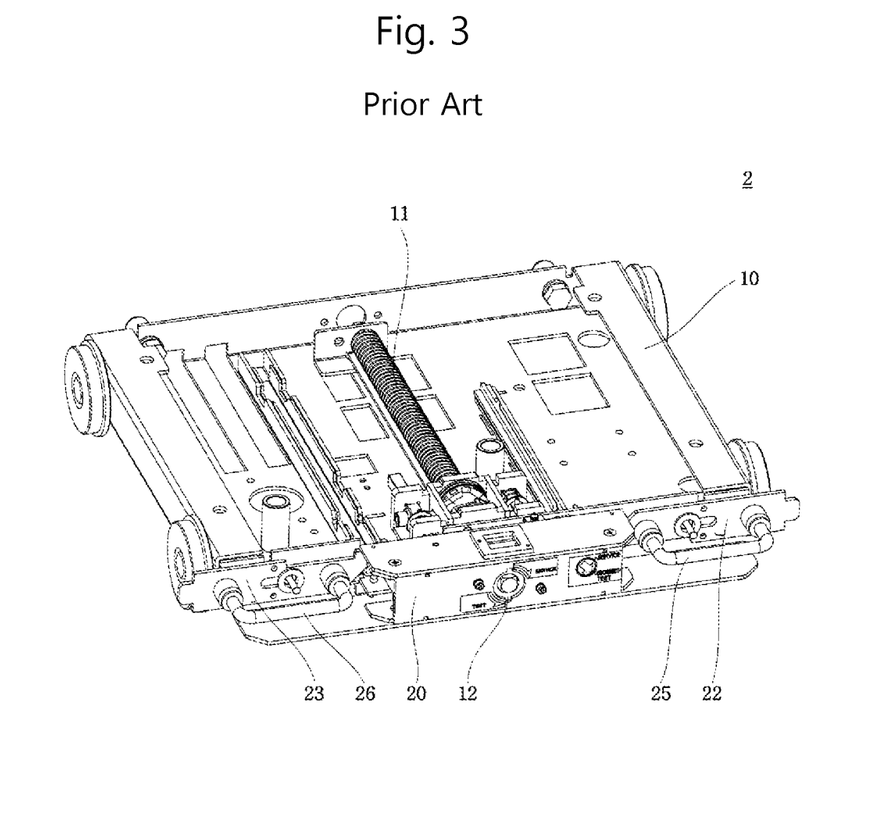
FIG. 3 is a perspective view illustrating a removed state of a body plate of a girder assembly in FIG. 2.

FIG. 2 is a perspective view of the transportation device 2 of FIG. 1, and FIG. 3 is a perspective view illustrating a removed state of a body plate 21 of a girder assembly 20 in FIG. 2. The body 1 of the circuit breaker is moved in a loaded state on the transportation device 2. Once a lead screw 11 is rotated by inserting a handle (not shown) into a handle groove 12 of the girder assembly 20 connected to a front surface of a truck assembly 10, an insert operation or a pull-out operation of the body 1 of the circuit breaker occurs while the truck assembly 10 is moving. In this case, the girder assembly 20 is fixed to a rail 5 of the cradle 3.

Figure 4A:
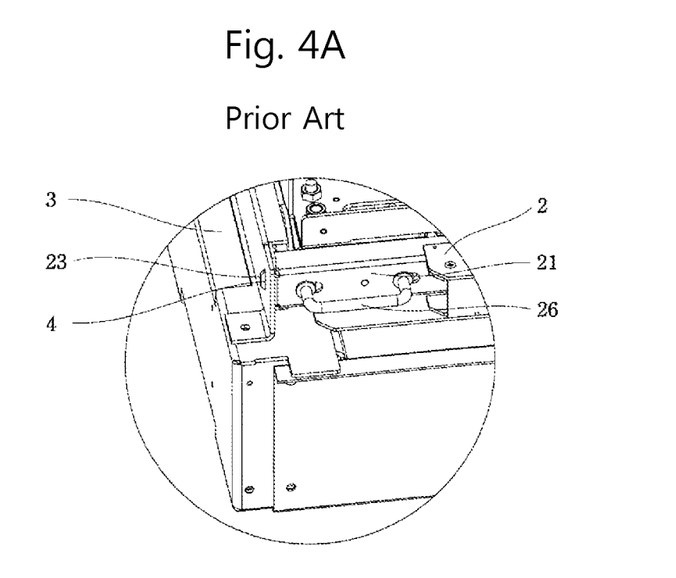
FIGS. 4A and 4B are views illustrating operation positions of a handle of a transportation device, which shows a restricted state implemented as a sliding plate of a transportation device is inserted into a rail groove of a cradle, and a released state implemented as the sliding plate is separated from the rail groove.
Figure 4B:
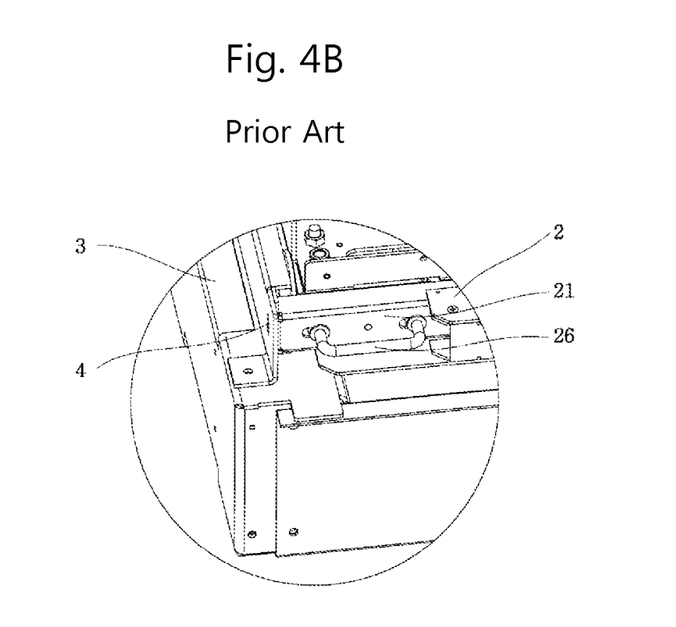

FIGS. 4A and 4B illustrate operation positions of handles of the transportation device 2. FIG. 4A shows a restricted state implemented as sliding plates 22, 23 of the transportation device 2 are inserted into rail grooves 4 of the cradle 3, and FIG. 4B shows a released state implemented as the sliding plates 22, 23 are separated from the rail grooves 4 of the cradle 3.

In case of separating the body 1 of the circuit breaker from the inside of the cradle 3 to the outside, handles 25, 26 of the girder assembly 20 should be inward moved, and the sliding plates 22, 23 connected to the handles 25, 26 should be separated from the rail grooves 4.

Handle assemblies 22,25 and 23,26 are coupled to the girder assembly 20. The handle assemblies 22,25 and 23,26 have an integral structure as the left and right sliding plates 22, 23 are coupled to the left and right handles 25, 26, respectively.

The left and right handles 25, 26 are simultaneously pushed toward the inside such that the left and right sliding plates 22, 23 are separated from the rail grooves 4. Then, the body 1 of the circuit breaker may be transferred to the outside of the cradle 3.

However, the conventional transportation device of the circuit breaker may have the following disadvantages.

Figure 5:
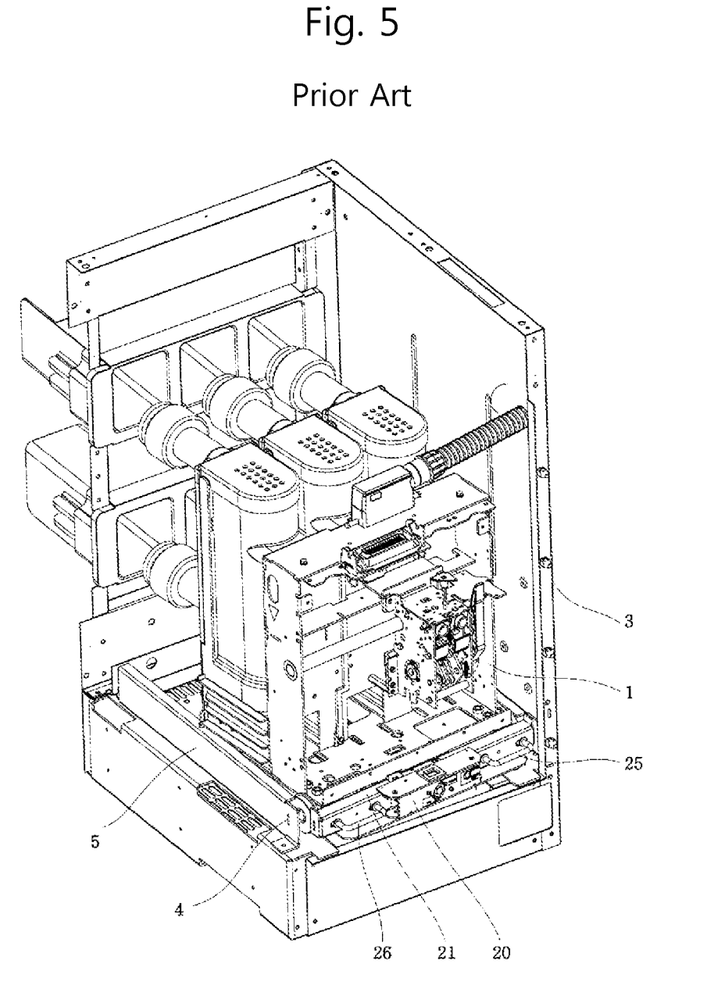
FIG. 5 is a view illustrating an abnormally separated state of a circuit breaker from a cradle.
Figure 6:
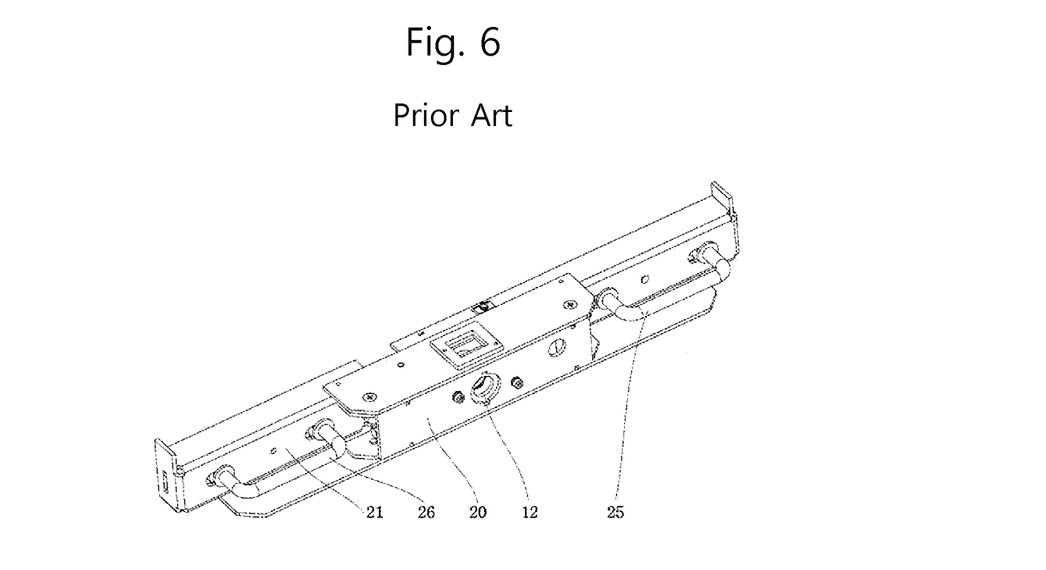
FIG. 6 is a front perspective view of a girder assembly in FIG. 5.
Figure 7:
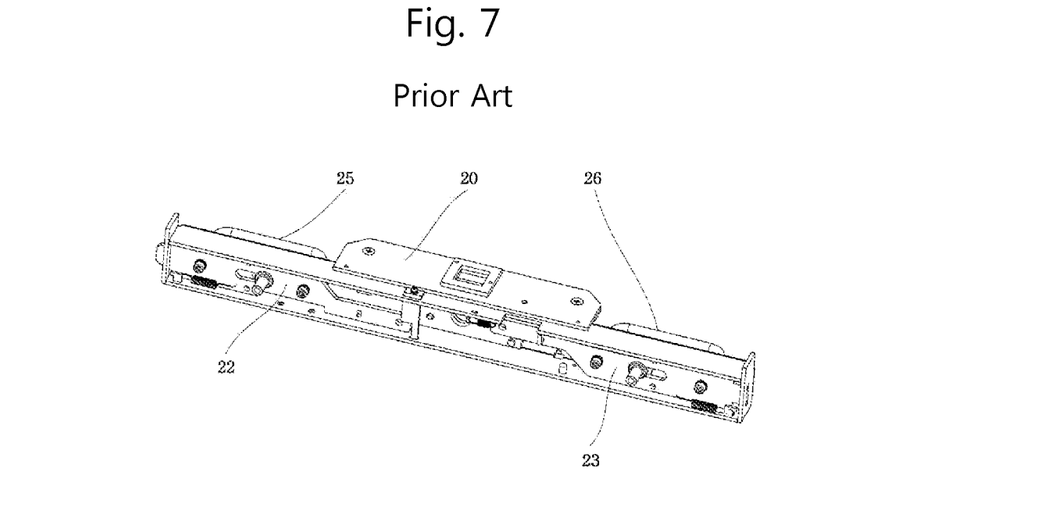
FIG. 7 is a rear perspective view of the girder assembly in FIG. 5.

Firstly, the handle assemblies 22,25 and 23,26 are formed so as to be moved individually. As a result, only one sliding plate 23 may be separated from the rail groove 4, while the other sliding plate 22 remains as it is by a user's maloperation, etc. FIG. 5 is a view illustrating an abnormally separated state of the circuit breaker from the cradle. FIG. 6 is a front perspective view of the girder assembly in FIG. 5. FIG. 7 is a rear perspective view of the girder assembly 20 in FIG. 5. The body 1 of the circuit breaker may not be separated from the inside of the cradle 3 to the outside, and damage of the components or accidents may be caused.

SUMMARY OF THE INVENTION

Therefore, an aspect of the detailed description is to provide a transportation device of a withdrawable circuit breaker capable of simultaneously moving right and left handles of a girder assembly for restricting movement of the transportation device or releasing a restricted state of the transportation device.

To achieve these and other advantages and in accordance with the purpose of this specification, as embodied and broadly described herein, there is provided a transportation device of a circuit breaker, including: a truck assembly on which a body of the circuit breaker is loadable; a body plate of a girder assembly installed on a front surface of the truck assembly; a pair of sliding plates slidably installed in the body plate; and a rotation plate having both sides to which leg portions of the sliding plates are rotatably coupled, respectively, wherein the rotation plate is inserted into a lead screw penetratingly-formed at a central part of the girder assembly.

Handles may be coupled to the pair of sliding plates, respectively.

Vertical slits for sliding a vertical movement of the sliding plates may be formed at the rotation plate, or at coupling parts of the leg portions.

The transportation device of a circuit breaker may further include a pair of connection links having one end rotatably coupled to the rotation plate and another end rotatably coupled to the leg portions, respectively.

A pair of arms may be protruding from the rotation plate in a rotation-symmetrical manner by 180°.

The pair of arms may be positioned at opposite sides to the leg portions of the sliding plates on the basis of a horizontal center line of the lead screw.

A bearing may be provided between the rotation plate and the lead screw.

In the transportation device of the circuit breaker according to an embodiment of the present invention, the right and left handles of the girder assembly for restricting movement of the transportation device of the circuit breaker, or for releasing a restricted state of the transportation device are simultaneously moved. With such a configuration, separation of only one sliding plate from the rail groove of the cradle can be prevented.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of preferred configurations of a transportation device of a circuit breaker according to the present invention, with reference to the accompanying drawings.

The same components of the present invention as the conventional ones are provided with the same reference numerals as the conventional ones.

Figure 8:
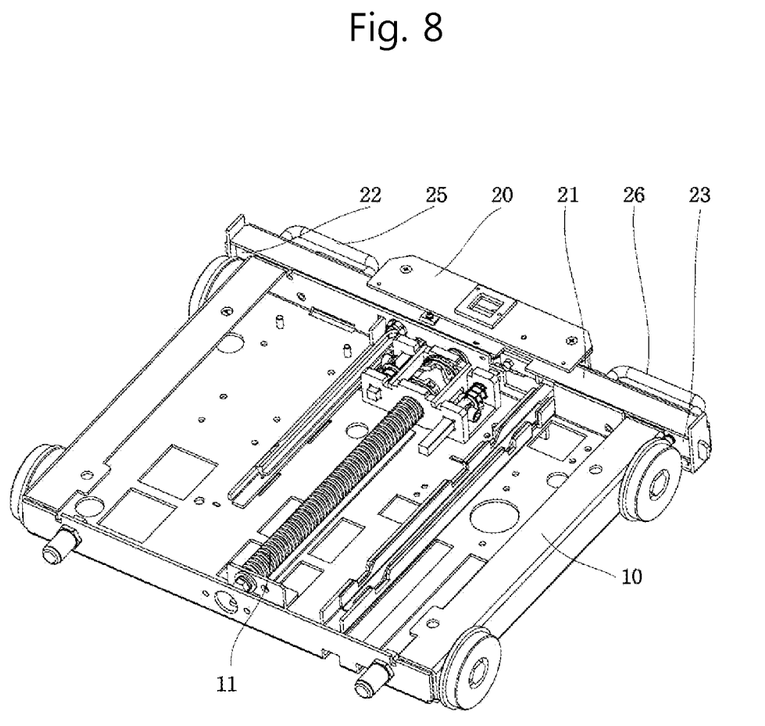
FIG. 8 is a rear perspective view of a transportation device according to an embodiment of the present invention.
Figure 9:
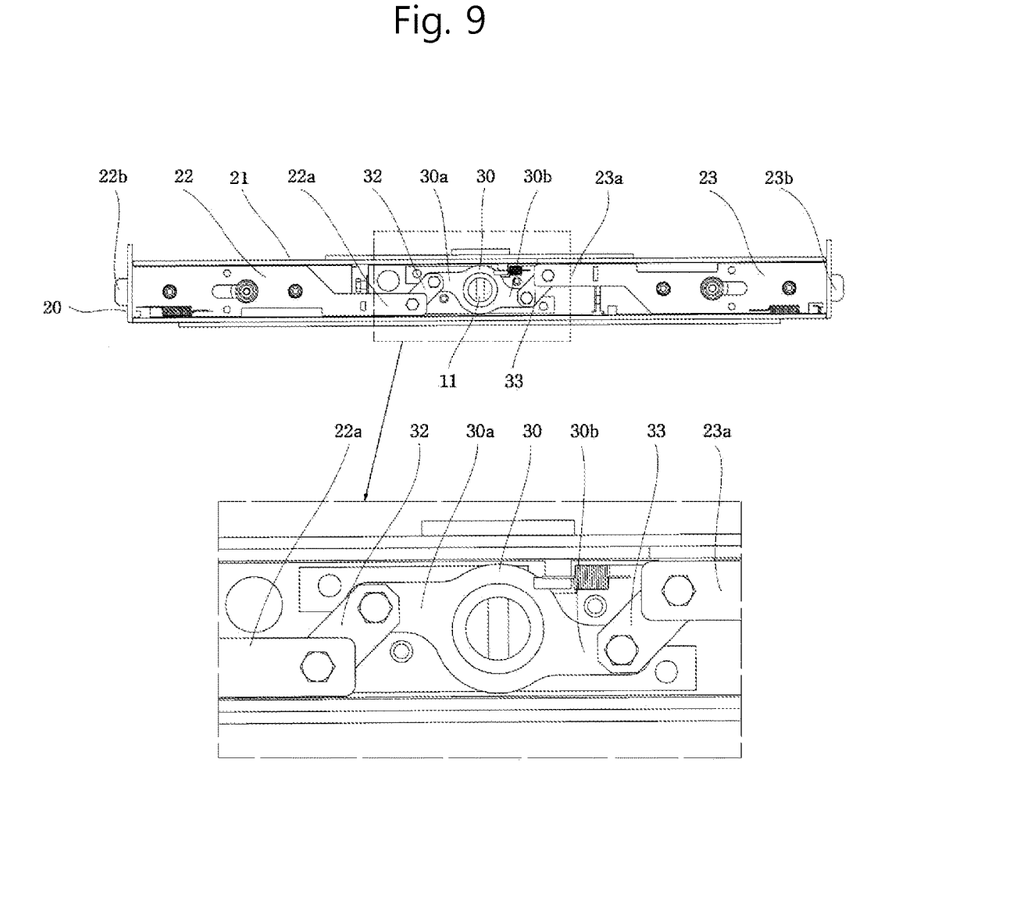
FIG. 9 is a rear perspective view of a girder assembly according to an embodiment of the present invention, which shows a state where a gap between handles is widened.
Figure 10:
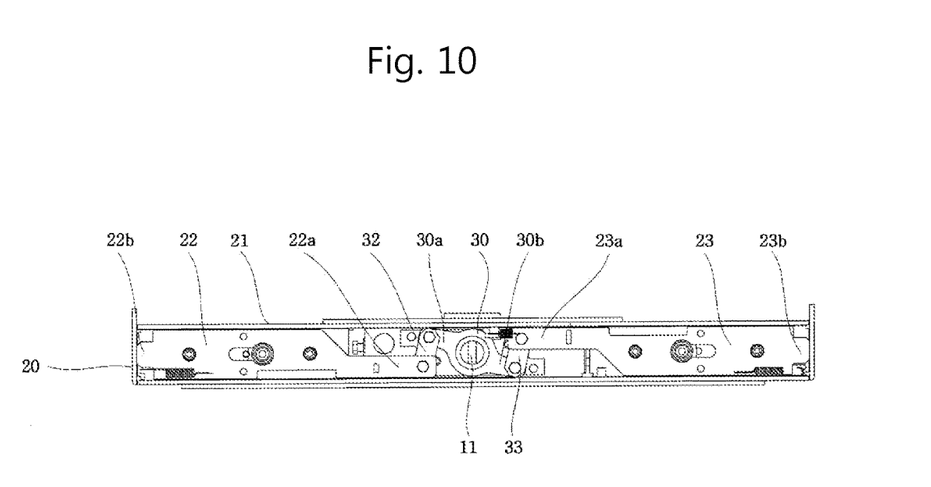
FIG. 10 is a rear perspective view of a girder assembly according to an embodiment of the present invention, which shows a state where a gap between handles is narrowed.
Figure 11:
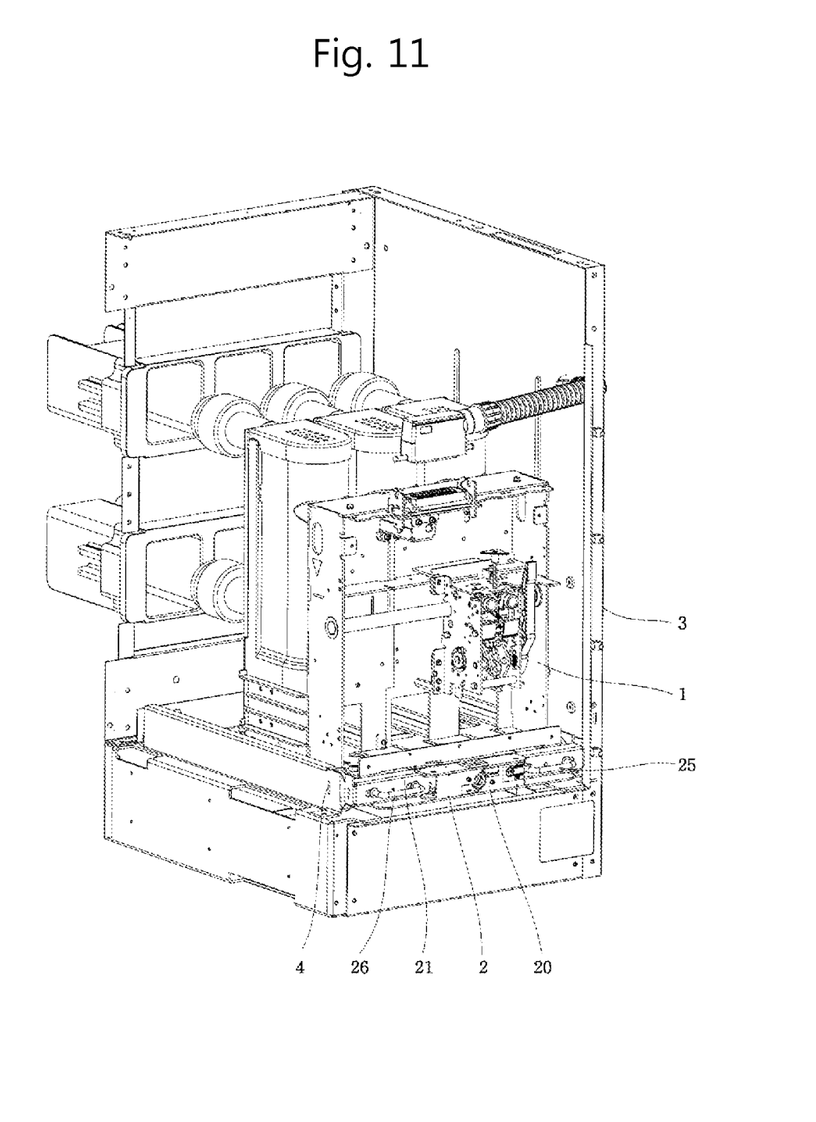
FIG. 11 is a view illustrating a normally withdrawn state of a transportation device according to an embodiment of the present invention, from a cradle.

FIG. 8 is a rear perspective view of a transportation device according to an embodiment of the present invention. FIG. 9 is a rear perspective view of a girder assembly according to an embodiment of the present invention, which shows a state where a gap between handles is widened. FIG. 10 is a rear perspective view of a girder assembly according to an embodiment of the present invention, which shows a state where a gap between handles is narrowed. FIG. 11 is a view illustrating a normally withdrawn state of a transportation device according to an embodiment of the present invention, from a cradle.

Hereinafter, embodiments of the present invention will be explained in more detail with reference to the attached drawings.

A transportation device of a circuit breaker according to an embodiment includes a breaker body 1; a truck assembly 10 configured to load the breaker body 1 thereon; a body plate 21 of a girder assembly 20 installed on a front surface of the truck assembly 10; a pair of sliding plates 22, 23 slidably installed in the body plate 21; and a rotation plate 30 having both sides to which leg portions 22a, 23a of the sliding plates 22, 23 are rotatably coupled, respectively. The rotation plate 30 is inserted into a lead screw 11 penetratingly-formed at a central part of the girder assembly 20.

The transportation device of the circuit breaker according to an embodiment of the present invention largely includes the truck assembly 10 configured to load the breaker body 1 thereon, and the girder assembly 20 installed on a front surface of the truck assembly 10. The truck assembly 10 may be manufactured by the conventional method. The girder assembly 20 includes a body plate 21 which forms appearance of the girder assembly 20, a pair of sliding plates 22, 23, and a rotation plate 30.

The body plate 21 may be formed in a box shape having an open rear surface. A pair of right and left handles 25, 26 are protruding from a front surface of the body plate 21. The lead screw 11, insertable into the truck assembly, is penetratingly-formed at a central part of the body plate 21.

The pair of sliding plates 22, 23 are slidably installed in the body plate 21. Referring to FIG. 9, the left sliding plate is called the first sliding plate 22, and the right sliding plate is called the second sliding plate 23. The sliding plates 22, 23 are provided with leg portions 22a, 23a, respectively. Referring to FIG. 9, the first leg portion 22a of the first sliding plate 22 is formed at a lower part on the basis of a horizontal center line, and the second leg portion 23a of the second sliding plate 23 is formed at an upper part on the basis of the horizontal center line. The horizontal center line indicates a line passing through a shaft center of the lead screw 11.

The sliding plate 22 is provided with a head portion 22b at an end thereof, and the sliding plate 23 is provided with a head portion 23b at an end thereof. The head portions 22b, 23b are parts insertable into rail grooves 4 of the cradle.

Handles 25, 26 are fixed to the sliding plates 22, 23. The first handle 25 is coupled to the first sliding plate 22, and the second handle 26 is coupled to the second sliding plate 23. The first and second sliding plates 22, 23 are moved as the first and second handles 25, 26 are moved, respectively.

The rotation plate 30 is formed in a disc shape, and is inserted into the lead screw 11. The rotation plate 30 is rotatable centering around a shaft of the lead screw 11.

A pair of arms 30a, 30b are protruding from the rotation plate 30. The pair of arms 30a, 30b may be protruding right and left. The pair of arms 30*a*, 30*b* may be formed to be symmetrical to each other. The pair of arms 30*a*, 30*b* may be formed to be rotation-symmetrical to each other. For instance, the first arm 30*a* may be formed at an upper part on the basis of the horizontal center line, and the second arm 30*b* may be formed at a lower part on the basis of the horizontal center line. In this case, the first and second arms 30*a*, 30*b* are positioned at opposite sides to the leg portions 22*a*, 23*a* on the basis of the horizontal center line. More specifically, the first arm 30*a* is positioned at an upper part on the basis of the horizontal center line, and the first leg portion 22*a* is positioned at a lower part on the basis of the horizontal center line.

Connection links 32, 33 are provided between the rotation plate 30 and the leg portions 22*a*, 23*a*. The first connection link 32 is provided between the first arm 30*a* and the first leg portion 22*a*, and the second connection link 33 is provided between the second arm 30*b* and the second leg portion 23*a*. That is, one end of the first connection link 32 is rotatably coupled to the first arm 30*a* of the rotation plate 30, and another end of the first connection link 32 is rotatably coupled to the first leg portion 22*a* of the first sliding plate 22.

The first connection link 32 connects the first sliding plate 22 with the rotation plate 30, and the second connection link 33 connects the second sliding plate 23 with the rotation plate 30. Thus, the first sliding plate 22 is interworked with the second sliding plate 23. That is, the first sliding plate 22 and the second sliding plate 23 are simultaneously moved. In this case, the sliding plates 22, 23 are moved in a rotation-symmetrical manner, by being restricted to a circular motion of the rotation plate 30 disposed therebetween. Thus, the sliding plates 22, 23 are moved to directions to become closer to each other, or to become distant from each other. That is, when a user holding the handles 25, 26 applies a force to the handles 25, 26 in a direction to make the handles 25, 26 come closer to each other or be distant from each other, the handles 25, 26 are moved to opposite directions with the same distance in a balanced manner. Referring to FIG. 9, if a user pulls the handles 25, 26 in a direction to make them come closer to each other, a state of FIG. 10 is implemented. In this case, no error occurs during an insert operation or a pull-out operation of the circuit breaker, because both of the handles 25, 26 are moved and the two handles 25, 26 are moved with the same distance. FIG. 11 is a view illustrating a normally withdrawn state of the transportation device according to an embodiment of the present invention, from the cradle.

Although not shown, a bearing (not shown) may be provided between the rotation plate 30 and the lead screw 11. As the bearing is interposed between the rotation plate 30 and the lead screw 11, friction may be reduced and an operation of the circuit breaker may be smoothly performed.

Figure 12:
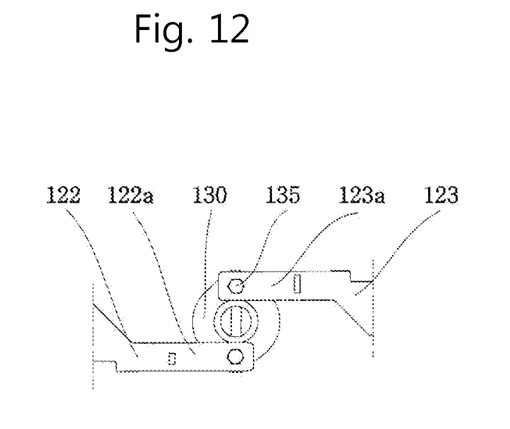
FIG. 12 is a partial detailed view of a transportation device according to another embodiment of the present invention.

FIG. 12 is a partial detailed view of a transportation device according to another embodiment of the present invention.

In this embodiment, leg portions 122*a*, 123*a* are directly connected to a rotation plate 130 without any connection links interposed therebetween. The leg portions 122*a*, 123*a* are rotatably coupled to the rotation plate 130. A first sliding plate 122 is interworked with a second sliding plate 123 by the rotation plate 130. The first sliding plate 122 is moved to a direction to become closer or become distant from the second sliding plate 123. A coupling member 135 may be implemented as any member for rotatable coupling, e.g. a bolt, a rivet, a pin, etc.

Figure 13:
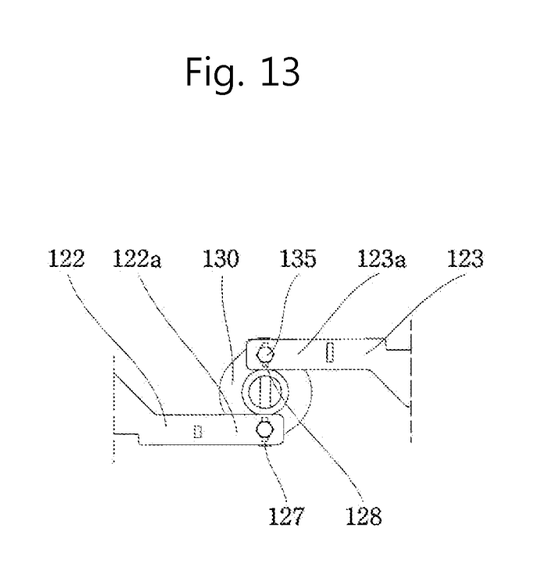
FIG. 13 is a partial detailed view of a transportation device according to still another embodiment of the present invention.

FIG. 13 is a partial detailed view of a transportation device according to still another embodiment of the present invention.

This embodiment is similar to the aforementioned embodiment except that vertical slits 127, 128 are formed at the rotation plate 130 or at coupling parts of the leg portions 122*a*, 123*a*. With such a configuration, a vertical movement of the rotation plate 130 is used as a sliding movement within the vertical slits, and only a horizontal movement of the rotation plate 130 is transmitted to the leg portions 122*a*, 123*a*.

The transportation device of the circuit breaker according to an embodiment of the present invention has the following advantages.

Firstly, since the right and left handles of the girder assembly for restricting movement of the transportation device of the circuit breaker or releasing a restricted state of the transportation device are simultaneously moved, separation of only one sliding plate from the rail groove of the cradle can be prevented.

Secondly, since another handle is moved with one handle even when the one handle is moved, a user's operation can be facilitated.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A transportation device of a circuit breaker, comprising:
a truck assembly on which a body of the circuit breaker is loadable;
a body plate of a girder assembly installed on a front surface of the truck assembly;
a first sliding plate and a second sliding plate slidably installed in the body plate;
a rotation plate installed between the first sliding plate and the second sliding plate; and
a first connection link and a second connection link,
wherein each of a first end of the first connection link and a first end of the second connection link are rotatably coupled to opposite sides of the rotation plate and a second end of the first connection link is rotatably coupled to a first leg portion of the first sliding plate and a second end of the second connection link is rotatably coupled to a second leg portion of the second sliding plate,
wherein the rotation plate rotates around a center axis of a lead screw penetratingly-formed at a central part of the girder assembly,
wherein the first leg portion is located at a lower part of the center axis and the second leg portion is located at an upper part of the center axis,
wherein a first arm and a second arm protrude from the rotation plate symmetrically right and left, the first arm is located at the upper part of the center axis and the second arm is located at the lower part of the center axis,
wherein the first connection link connects the first leg portion and the first arm and the second connection link connects the second leg portion and the second arm, wherein handles are coupled to the first sliding plate and the second sliding plate, respectively, and wherein, when a first force is applied to one of the handles coupled to the first sliding plate and causes the first sliding plate to move in a first direction along the body plate, the second sliding plate is caused to move in a second direction opposite the first direction through the first connection link, the rotation plate and the second connection link, and wherein, when a second force is applied to another of the handles coupled to the second sliding plate and causes the second sliding plate to move in a third direction along the body plate, the first sliding plate is caused to move in a fourth direction opposite the third direction through the second connection link, the rotation plate and the first connection link.

2. The transportation device of a circuit breaker of claim 1, wherein a bearing is provided between the rotation plate and the lead screw.

\* \* \* \* \*